(12) United States Patent
Weltman

(10) Patent No.: US 8,965,843 B2
(45) Date of Patent: Feb. 24, 2015

(54) PRIORITIZED REPLICATION PATHS

(75) Inventor: Ulf Martin Weltman, Milpitas, CA (US)

(73) Assignee: Hewlett-Packard Development Company, L.P., Houston, TX (US)

(*) Notice: Subject to any disclaimer, the term of this patent is extended or adjusted under 35 U.S.C. 154(b) by 1896 days.

(21) Appl. No.: 12/018,323

(22) Filed: Jan. 23, 2008

(65) Prior Publication Data

US 2009/0187611 A1 Jul. 23, 2009

(51) Int. Cl.
*G06F 17/30* (2006.01)
(52) U.S. Cl.
CPC .................. *G06F 17/30067* (2013.01)
USPC .......................... 707/610; 707/638
(58) Field of Classification Search
USPC .................. 707/610, 638
See application file for complete search history.

(56) References Cited

U.S. PATENT DOCUMENTS

| | | | | |
|---|---|---|---|---|
| 6,463,454 B1* | 10/2002 | Lumelsky et al. | ............ | 718/105 |
| 6,732,122 B2* | 5/2004 | Zoltan | ............ | 707/610 |
| 7,194,495 B2* | 3/2007 | Moir et al. | .................... | 707/610 |
| 2006/0002340 A1* | 1/2006 | Criss et al. | .................... | 370/328 |
| 2006/0173993 A1* | 8/2006 | Henseler et al. | ............. | 709/224 |
| 2007/0124459 A1* | 5/2007 | Kasama | ........................ | 709/224 |
| 2007/0245338 A1* | 10/2007 | Musha | ......................... | 717/173 |

\* cited by examiner

*Primary Examiner* — Kim Nguyen
(74) *Attorney, Agent, or Firm* — Lowe, Hauptman & Berner, LLP

(57) ABSTRACT

A method of updating data at one or more nodes and a corresponding system are described. The method comprises determining a node to which a data update is to be transmitted, wherein the node has a node priority. The method also comprises determining a version of data to be provided to the determined node based on a comparison of the version of data at the determined node with another node having a higher node priority and transmitting the determined version of data to the node.

21 Claims, 12 Drawing Sheets

PRIORITIZED REPLICATION PATHS

BACKGROUND

In some environments, data is shared across many applications and/or devices. To accomplish the data sharing, data is replicated to many servers which distribute the data across the environment. For example, in some instances data is localized close to clients accessing the data in order to assure that a copy of the data is more likely to be available if failures cause one or two of the servers to become unavailable.

In accordance with some environments, a few of the servers maintain master copies of the data, while a larger number of other distributed servers contain read-only replica copies of the data. The data replication paths between these servers may be loosely coupled, such that if server failures occur, a replica data server contacts an alternate or backup server to synchronize updates of the data at the replica server. However, in some instances, a replica data server attempting to synchronize with an alternate server may discover that the replica data server stores a more recent copy of the data than is available on the alternate server. This situation can occur when the replica data server received updates from the master data server before the alternate data server received updates.

DESCRIPTION OF THE DRAWINGS

One or more embodiments are illustrated by way of example, and not by limitation, in the figures of the accompanying drawings, wherein elements having the same reference numeral designations represent like elements throughout and wherein.

DETAILED DESCRIPTION

Figure 1:
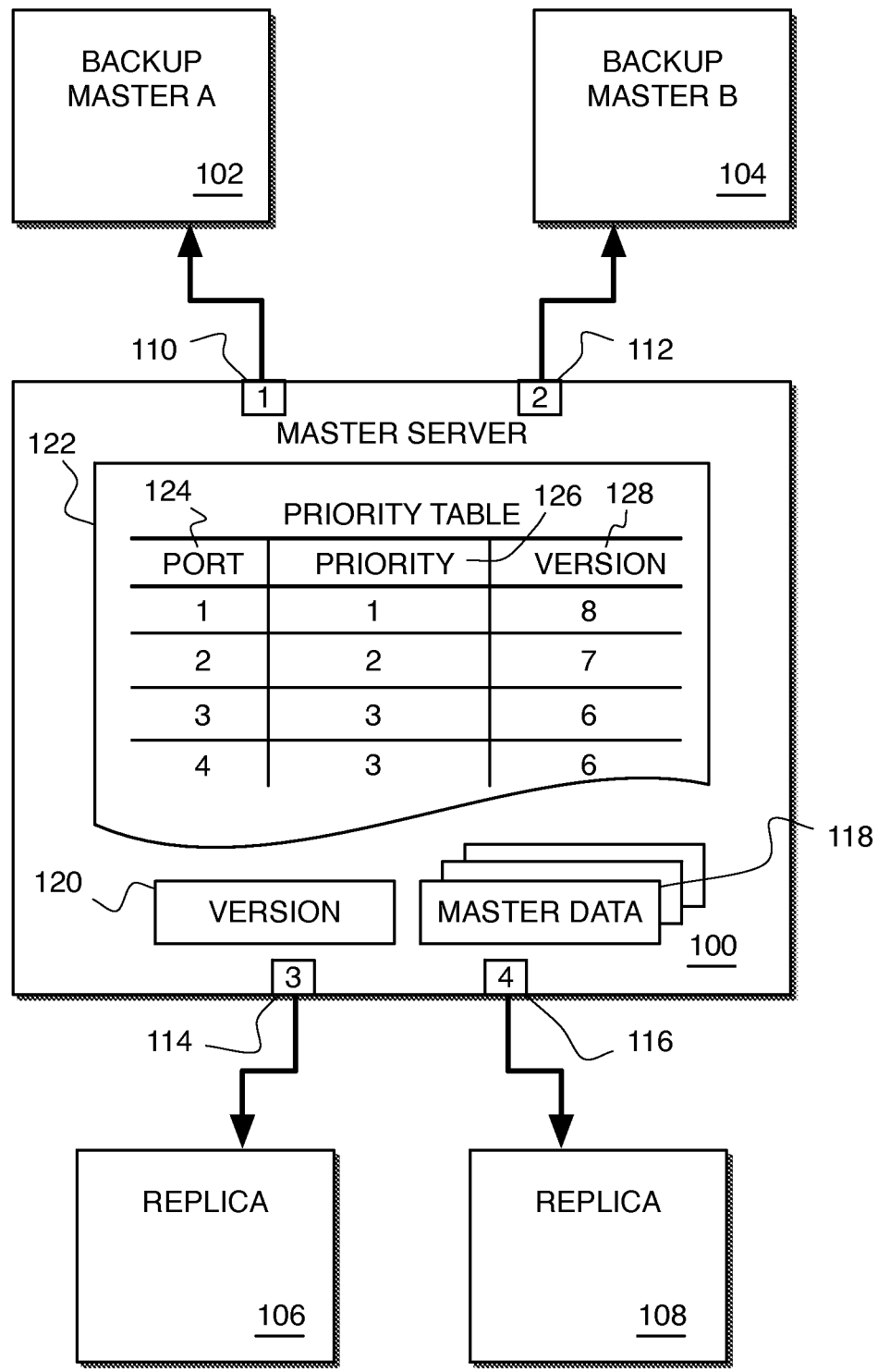
FIG. 1 is a high-level block diagram of a system for prioritizing data updates according to an embodiment.

FIG. 1 depicts a high-level block diagram of a system, i.e., master server 100, for prioritizing data updates to several nodes, i.e., a backup master A 102, a backup master B 104, a first replica 106, and a second replica 108, according to an embodiment. Master server 100 comprises a processor or controller-based system such as a computer or other networked device. In at least some embodiments, there may be more than one master server communicatively coupled with each other.

In at least some embodiments, master server 100 may comprise a lightweight directory access protocol (LDAP) server. In accordance with the LDAP embodiment, master server 100 pushes, i.e., transmits, data updates to the several nodes in order to provide backup data stores and improve accessibility to the stored data.

In at least some embodiments, nodes 102, 104, 106, 108 may be computers and/or other networked devices. In at least some embodiments, greater or fewer numbers of nodes may be connected to master server 100. In at least some embodiments, the connections between master server 100 and the several nodes are bidirectional communication links. In at least some embodiments, a push-based update mechanism is used to enable master server 100 to transmit updates to the several nodes. In at least some embodiments, a pull-based update mechanism is used to enable the several nodes to obtain updates from master server 100. For clarity and ease of understanding the replicated data at each of the several nodes is not depicted in FIG. 1.

In at least some embodiments, master server 100 is communicatively coupled with several nodes via a connection between the nodes and a corresponding number of ports of the master server, i.e., first port 110, second port 112, third port 114, and fourth port 116. Master server 100 is communicatively coupled with backup master A 102 via first port 110, backup master B 104 via second port 112, first replica 106 via third port 114, and second replica 108 via fourth port 116.

In at least some embodiments, there is a one-to-one correspondence between ports and nodes. In at least some embodiments, there may be multiple nodes corresponding to a single port and in such an instance the same priority would be applied to each of the nodes corresponding to the port.

Master server 100 comprises master data 118, a copy of which is to be replicated to the several nodes. Master server comprises one or more versions of master data 118, as depicted, based on changes to the data over time. Different versions of master data 118 correspond to the master data at a given time or a particular state of the system. In accordance with the LDAP embodiment, master data 118 comprises one or more LDAP records and the different master data versions correspond to the LDAP records at different times.

Master server 100 also comprises a version identifier 120 which corresponds to the most recent version of master data 118. Version identifier 120 may be an alphabetic, numeric, and/or other symbolic value identifying the version of master data 118.

Master server 100 also comprises a priority table 122 for storing port information, priority information, and version information corresponding to each port 110, 112, 114, 116. In at least some embodiments, priority table 122 comprises the port, priority, and version information for each port to which a node is determined to be connected to master server 100. In at least some further embodiments, priority table 122 comprises the port, priority, and version information for only each port to which a node is determined to be connected. In at least some embodiments, version identifier 120 and priority table 122 may be combined into a single storage element, e.g., version identifier 120 may be stored as an entry in priority table 122. In at least some embodiments, priority table 122 may further comprise a host identifier corresponding to a host name and/or host identification mechanism, e.g., an Internet Protocol (IP) address, of the node corresponding to the particular entry of priority table 122.

Priority table 122 comprises zero or more entries identifying ports corresponding to nodes to which a version of master data 118 is to be pushed. Each entry in priority table 122 comprises a port identifier 124, a port priority identifier 126, and a port version identifier 128. Port identifier 124 identifies the port corresponding to the entry in priority table 122. Port identifier 124 may comprise an alphabetic, numeric, and/or other identifier or combination thereof to uniquely identify the port of master server 100. In at least some embodiments, port priority table 122 comprises an entry corresponding to version identifier 120 in order to enable a traversal of the priority and versions of master server 100 and the several nodes 102, 104, 106, 108. In at least some embodiments, version identifier 120 is replaced through the use of a corresponding entry in port priority table 122 as described.

Port priority identifier 126 identifies a predetermined priority of the port corresponding to the entry in priority table 122. Port priority identifier 126 may comprise an alphabetic, numeric, and/or other identifier or combination thereof to identify a sortable value indicative of the priority of the entry with respect to other entries in priority table 122.

In at least some embodiments, a user sets the predetermined priority of port priority identifier 126 based on a determination of the priority of each of the several nodes with respect to each other.

Port version identifier 128 identifies the version of data stored at the node corresponding to the port. Port version identifier 128 may comprise an alphabetic, numeric, and/or other identifier or combination thereof to identify the version of data.

Figure 2:
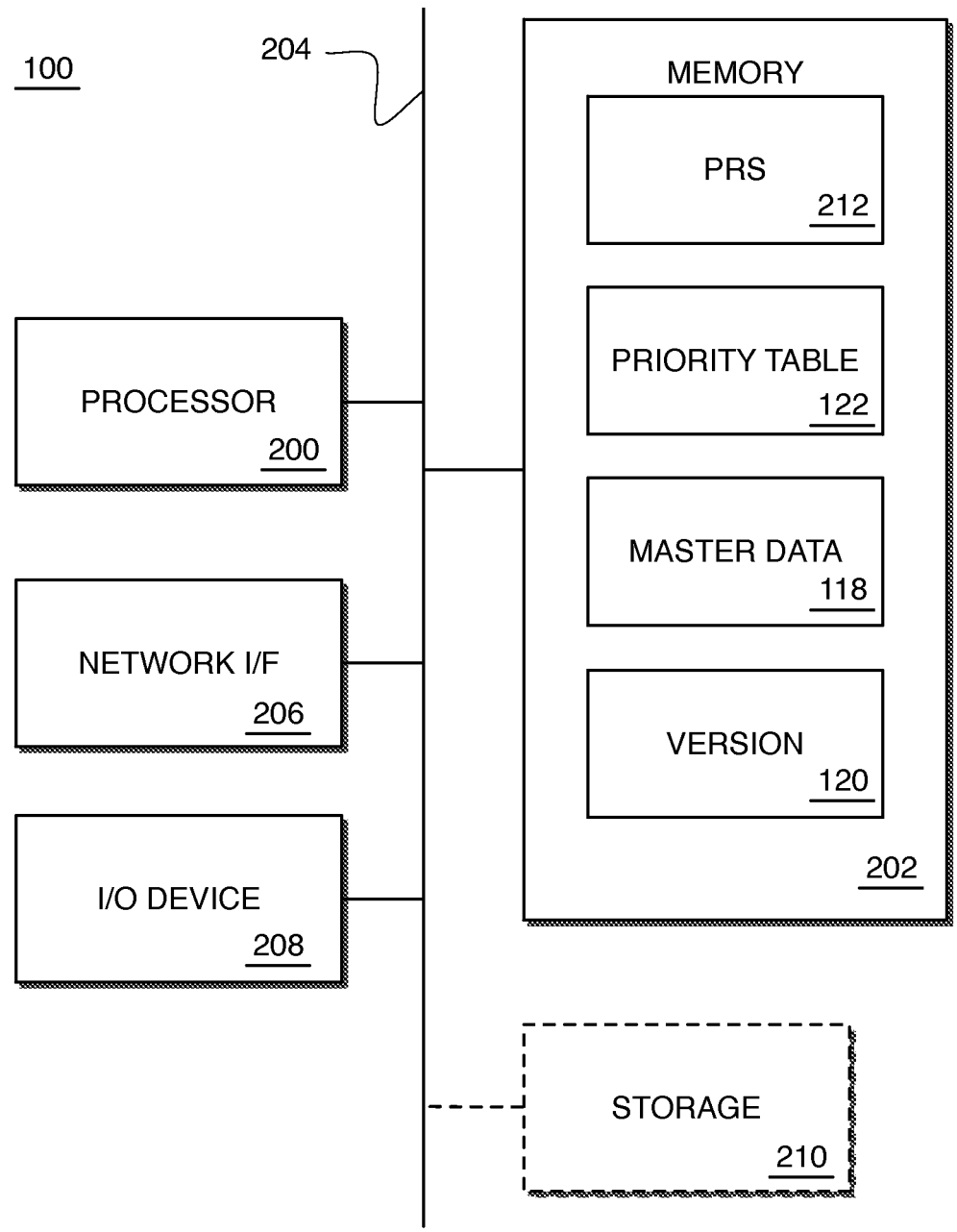
FIG. 2 is a high-level block diagram of a master server according to an embodiment.

FIG. 2 depicts a high-level functional block diagram of master server 100 usable in conjunction with one or more embodiments. Computer system 100 comprises a processor 200, a memory 202, a network interface (I/F) 206, a storage 210, and an input/output device 208 communicatively coupled via a bus 204 or other interconnection communication mechanism.

Memory 202 (also referred to as a computer-readable medium) may comprise a random access memory (RAM) or other dynamic storage device, coupled to the bus 204 for storing data and instructions to be executed by processor 200, e.g., a prioritized replication system (PRS) 212. Memory 202 also may be used for storing temporary variables or other intermediate information during execution of instructions to be executed by processor 200. Memory 202 may also comprise a read only memory (ROM) or other static storage device coupled to the bus 204 for storing static information and instructions for the processor 200.

Network I/F 206 comprises a mechanism for connecting to another device such as the several nodes. In at least some embodiments, master server 100 comprises more than a single network interface.

A storage device (storage 210), such as a magnetic disk or optical disk, may also be provided and coupled to the bus 204 for storing data such as priority table 122, master data 118, PRS 212, version 120, and other data and/or instructions.

I/O device 208 may comprise an input device, an output device and/or a combined input/output device for enabling user interaction with PRS 212. An input device may comprise, for example, a keyboard, keypad, mouse, trackball, trackpad, and/or cursor direction keys for communicating information and commands to processor 200. An output device may comprise, for example, a display, a printer, a voice synthesizer, etc. for communicating information to a user.

The functions of a method described in connection with the embodiments disclosed herein may be embodied in hardware, software, or a combination thereof. Software comprising instructions for execution may reside in a computer-readable medium comprising volatile and/or non-volatile memory, e.g., a random access memory, a read only memory, a programmable memory, a hard disk, a compact disc, or another form of storage medium readable, directly or indirectly, by a processing device.

Figure 3:
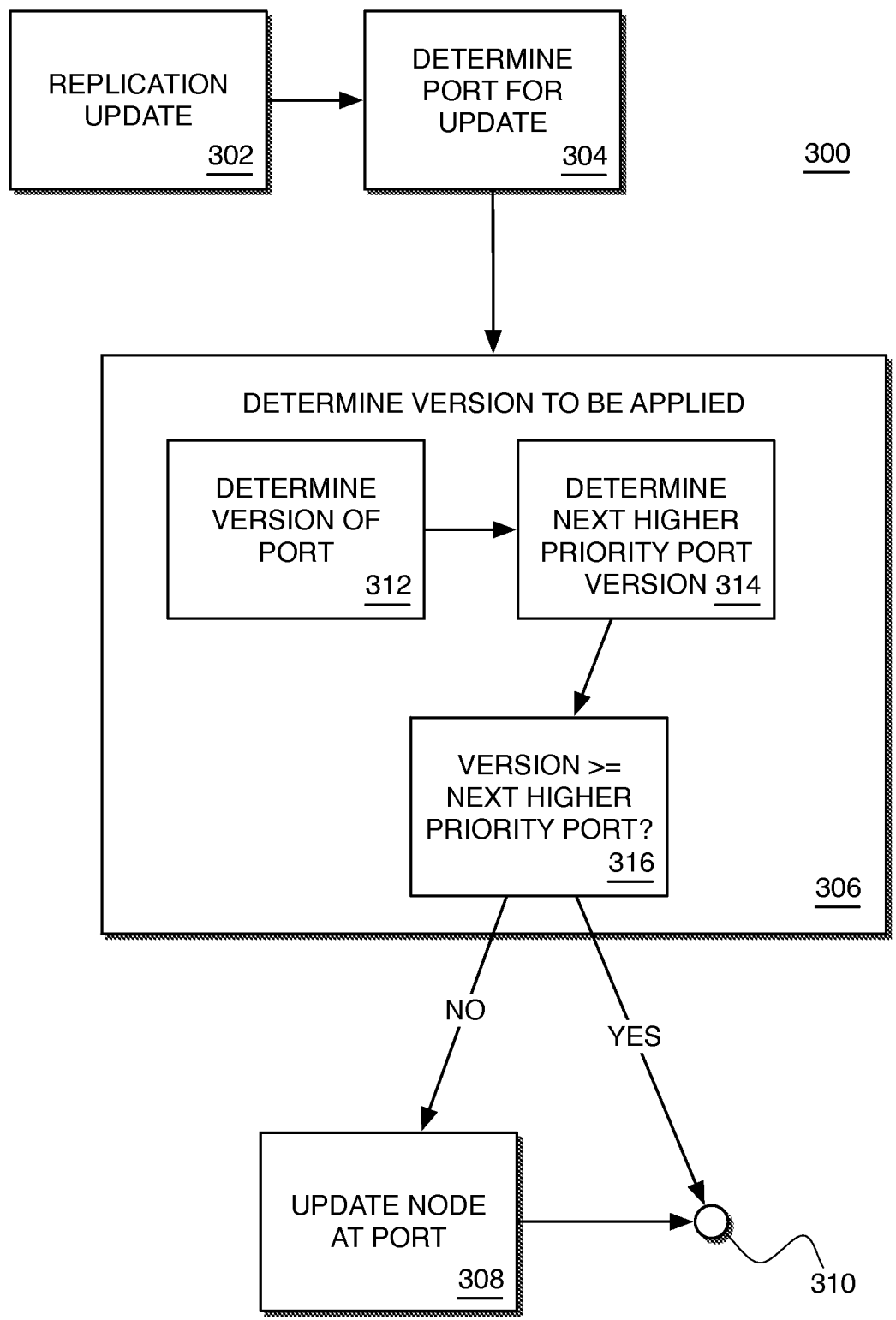
FIG. 3 is a high-level process flow diagram according to an embodiment.

FIG. 3 depicts a high-level process flow 300 of at least a portion of PRS 212 according to an embodiment. Process flow 300 begins at replication update functionality 302 wherein processor 200 executing a set of executable instructions, e.g., as stored in memory 202, determines that a replication of master data 118 is to be pushed to the several nodes.

In at least some embodiments, an update is transmitted from master server 100 based on a time-based determination, a change-based determination, or a combination thereof. For example, in at least some embodiments, an update may be transmitted based on a determination of a given percentage amount of change to master data 118. In another embodiment, an update may be transmitted based on a determination of a given elapsed time period subsequent to a modification of master data 118. In at least some embodiments, an administrator determines the basis of the update transmission determination and stores a setting on master server 100 to configure PRS 212.

The flow proceeds to determine port functionality 304 wherein processor 200 executing a set of executable instructions determines which port entry in priority table 122 is to be updated. In at least some embodiments, processor 200 performs a sequential priority-based traversal of priority table 122 to determine the next port entry for update, e.g., from higher priority entries to lower priority entries. In at least some embodiments, processor 200 traverses priority table 122 based on the port priority and port version information stored in each entry.

The flow proceeds to determine version functionality 306 wherein processor 200 executing a set of executable instructions determines whether, and to which version, the node corresponding to the port determined as a result of determine port functionality 304 is to be updated, i.e., the processor determines which version of master data 118 is to be applied to the determined node. In at least some embodiments, the version for a particular node is the version corresponding to the least updated node of higher priority nodes of priority table 122. Depending on the result of determine version functionality 306, the flow proceeds to either update node functionality 308 or completion 310.

During update node functionality 308, processor 200 executing a set of executable instructions causes network I/F 206 to transmit the determined version of master data 118 toward the node corresponding to the determined port. In at least some embodiments, update node functionality 308 updates the node corresponding to the determined port to the point where the version matches the least updated of the higher priority nodes in priority table 122. The flow then proceeds to completion 310.

Returning to determine version functionality 306, the flow proceeds to determine port version functionality 312 wherein processor 200 executing a set of executable instructions determines the version of the data stored at the node corresponding to the port entry by reference to the port version information in priority table 122.

The flow proceeds to determine next version functionality 314 wherein processor 200 executing a set of executable instructions determines the version of the entry of priority table 122 corresponding to the next higher priority entry in the priority table. For example, with reference to the priority table depicted in FIG. 1, an update to the entry identified by port identifier value of 3 determines that the next higher priority entry is the entry identified by port identifier value of 2 and a port version identifier value of 7.

The flow proceeds to comparison functionality 316 wherein processor 200 executing a set of executable instructions determines whether the version of the determined port (as a result of determine port functionality 304) is greater than or equal to the version of the next higher priority entry determined as a result of determine next version functionality 314.

If the result of the comparison is positive ("YES"), the version of the data stored at the node corresponding to the determined port is at the highest allowed version and the node will not be updated. The flow proceeds to completion 310.

If the result of the comparison is negative ("NO"), the version of the data stored at the node corresponding to the determined port needs updating. The flow proceeds to update node functionality 308 and the next higher master data 118 version is caused to be transmitted to the node via the determined port.

Figure 4:
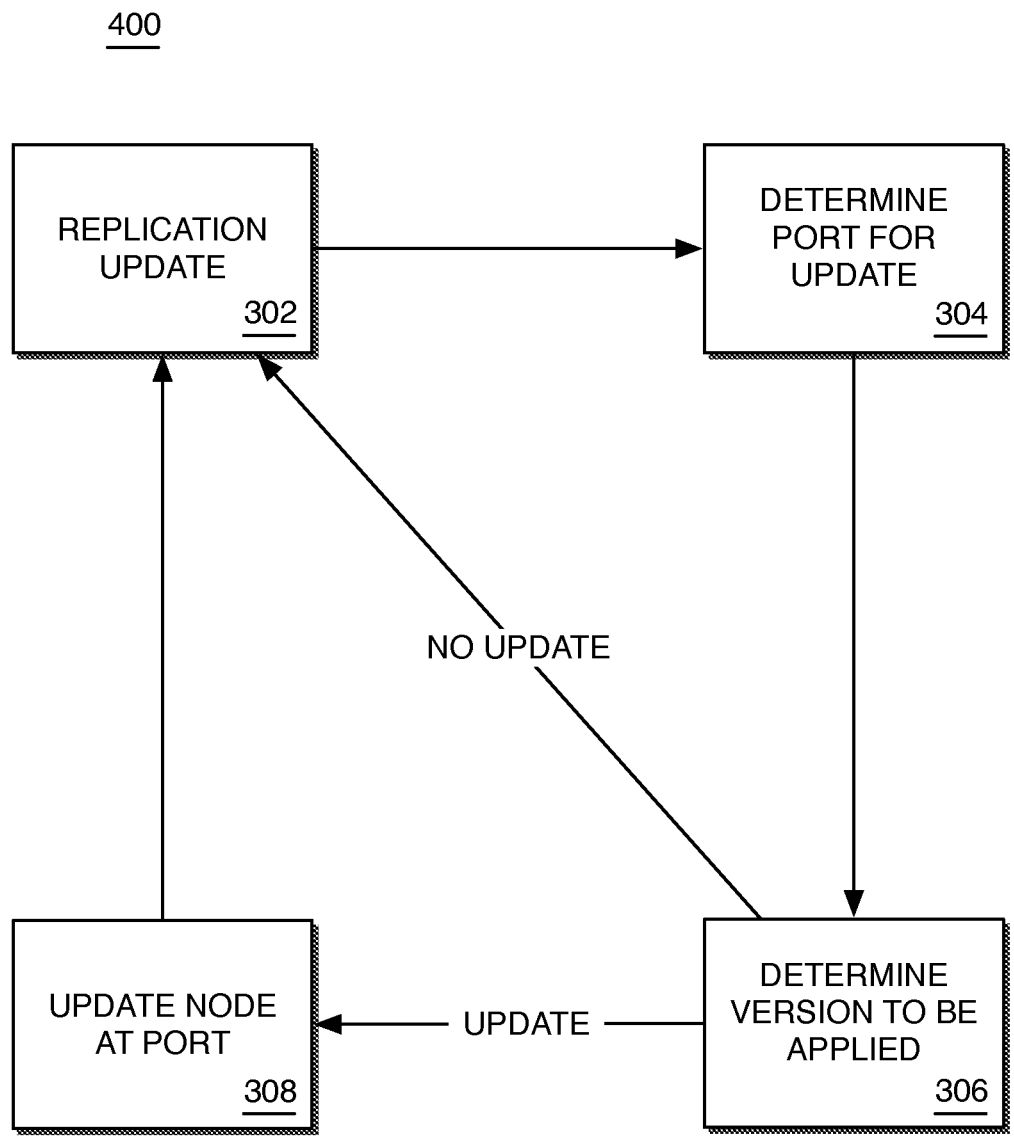
FIG. 4 is a high-level process flow diagram according to another embodiment.

FIG. 4 depicts a high-level process flow 400 of a variation of the FIG. 3 embodiment in which subsequent to update node functionality 308 and as a result of a negative outcome of the determine version functionality 306, the process flow returns to replication update functionality 302.

Figure 5:
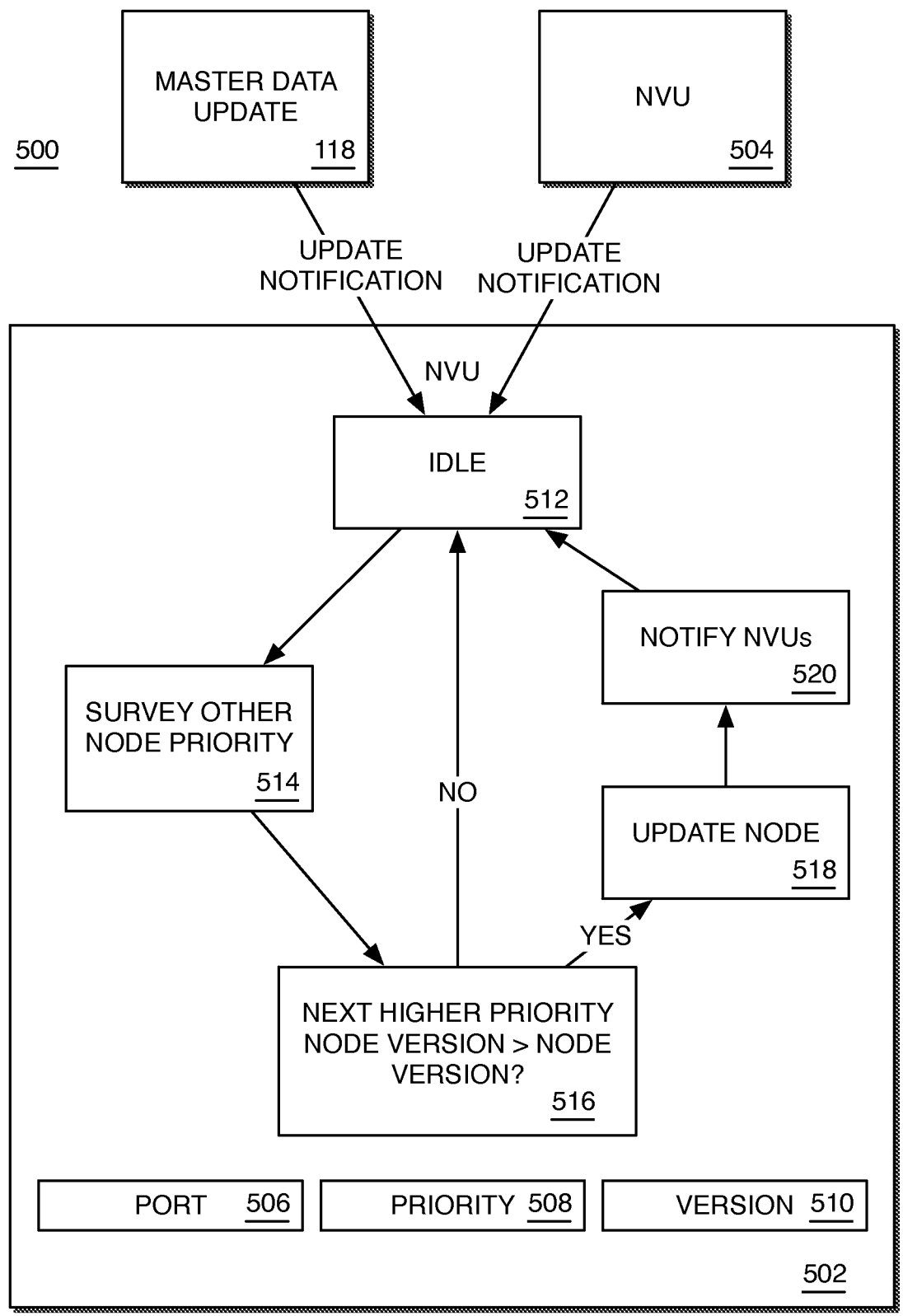
FIG. 5 is a high-level process flow diagram according to another embodiment.

FIG. 5 depicts a high-level process flow 500 according to another embodiment in which priority table 122 is replaced with one or more node version update (NVU) functionalities, e.g., NVU 502, 504, each of which comprise a set of executable instructions for monitoring and updating the version of data stored at one or more of the several nodes 102, 104, 106, 108. In at least some embodiments, each NVU 502, 504 stores a port identifier 506, port priority identifier 508, and port version identifier 510 corresponding to a node as part of the NVU, i.e., the entry information corresponding to port identifier 124, port priority identifier 126, and port version identifier 128 of priority table 122.

FIG. 5 depicts a detailed view of a high-level process flow of NVU 502 according to an embodiment. The process flow of NVU 502 begins at idle functionality 512. In at least some embodiments, idle functionality 512 represents a state in which NVU 502 is asleep or suspended and not being executed by master server 100.

NVU 502 receives an update notification signal indicating that an update has been performed on master data 118, i.e., the master data version 120 has been updated along with the data in master data 118. In at least some embodiments, the update notification signal is received from PRS 212. Responsive to receipt of the update notification signal, the flow proceeds to survey other node priority functionality 514.

During survey other node priority functionality 514, processor 200 executing a set of executable instructions determines the next highest priority stored in an other NVU, e.g., NVU 504, and the version of the next highest priority stored in, for example, NVU 504.

The flow proceeds to comparison functionality 516 wherein processor 200 executing a set of executable instructions determines whether the version of the next highest priority NVU (as a result of survey other node priority functionality 514) is greater than version 510. In at least some embodiments, master server 100, specifically version identifier 120, is surveyed by NVU 502 in performing functionality 516.

If the result of the comparison is negative ("NO"), version 510 is at the highest allowed version and the corresponding node will not be updated. The flow proceeds to return to idle functionality 512.

If the result of the comparison is positive ("YES"), version 510 needs updating. The flow proceeds to update node functionality 518 and the next higher master data 118 version is caused to be transmitted to the corresponding node at port identifier 506. The flow then proceeds to notify functionality 520.

In at least some embodiments, during update node functionality 518, NVU 502 sequentially transmits each version update between the present value of version 510 and the value of the determined next highest priority node version value. In at least some embodiments, during update node functionality 518, NVU 502 transmits a single version update to the corresponding node at port identifier 506.

During notify functionality 520, processor 200 executing a set of executable instructions transmits an update notification signal to the other NVUs to cause the receiving NVUs to transition from idle functionality 512. FIG. 5 depicts transmission of an update notification signal from NVU 504 to NVU 502 according to notify functionality 520. In at least some embodiments, receipt of the update notification signal from NVU 502 by the other NVUs causes the NVUs to wake up and begin execution. The flow then returns to idle functionality 512.

In at least some embodiments, the NVUs do not replace priority table 122 and in accordance therewith, the NVUs access information stored in the priority table, e.g., port priority identifiers and port version identifiers. In at least some embodiments, there is a one-to-one correspondence between NVUs and nodes 102, 104, 106, 108.

Figure 6:
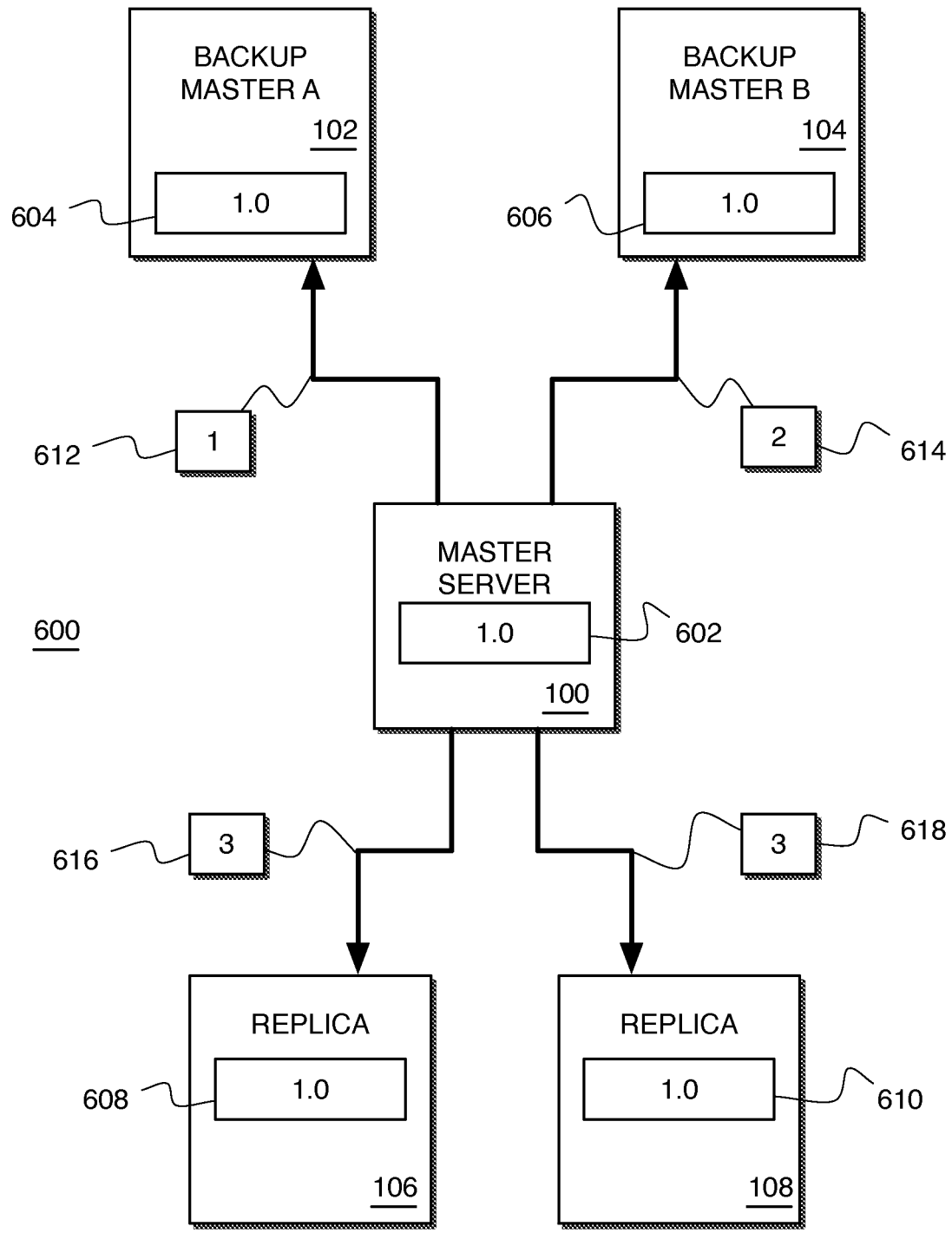
FIG. 6 is a high-level diagram of the FIG. 1 system at a first state.

FIG. 6 depicts a high-level diagram of the FIG. 1 embodiment at a first state wherein the master data stored at each of master server 100 and the several nodes 102, 104, 106, 108 are at the same version as depicted by the numeral referenced as 602, 604, 606, 608, 610 at the respective master server and nodes. FIG. 6 depicts a simplified version of the FIG. 1 embodiment and identifies the priority assigned to the port along the connection from master server 100 to each of the several nodes, i.e., the boxes identified by reference numbers 612, 614, 616, 618.

As depicted in FIG. 6, each of master server 100 and the several nodes store master data at a version identifier of 1.0.

Figure 7:
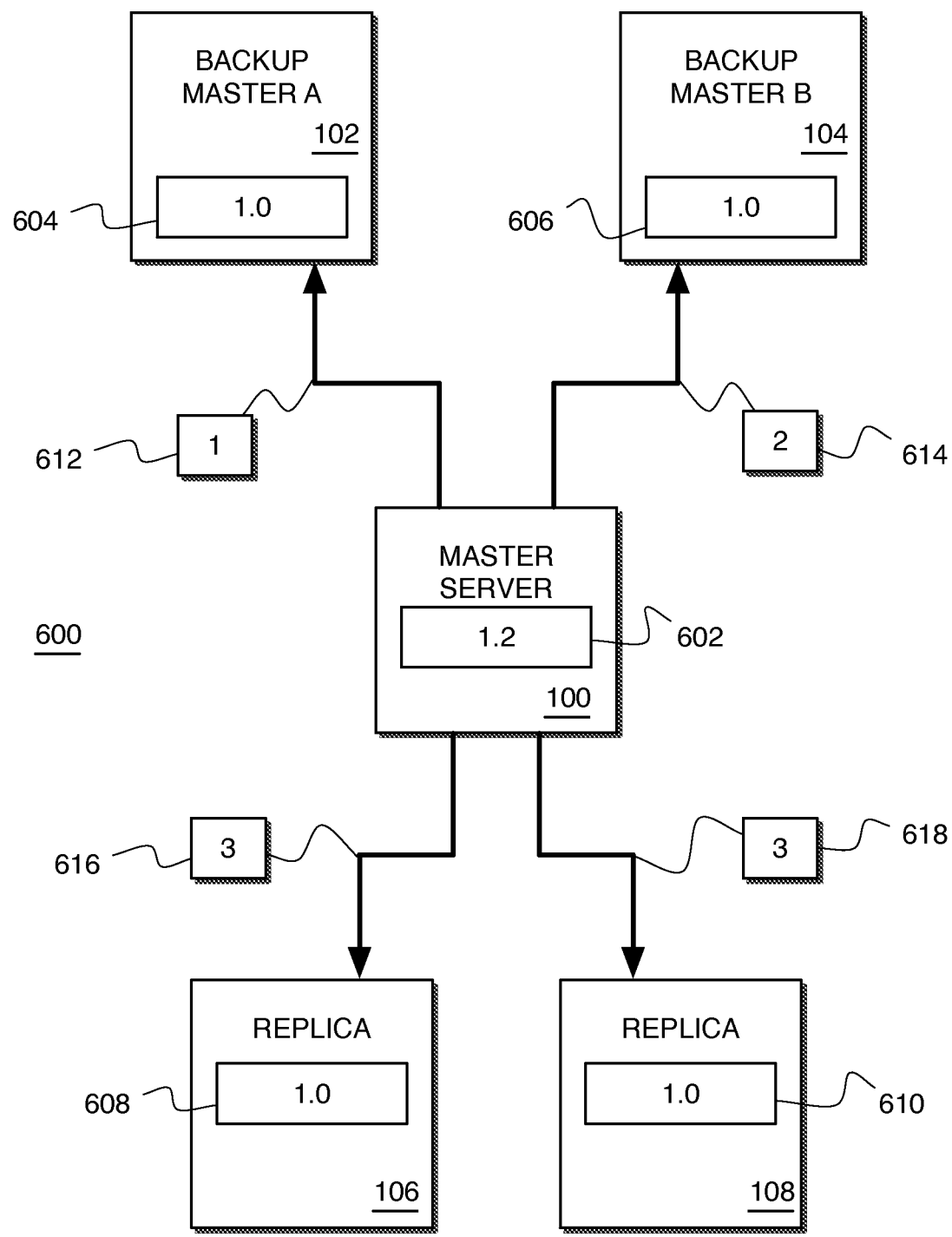
FIG. 7 is a high-level diagram of the FIG. 1 system at a second state.

FIG. 7 depicts the high-level diagram of FIG. 6 at a second state after two updates have been made to master data 118 of master server 100, i.e., version identifier 602 is set to 1.2. No updates have been pushed to the several nodes.

Figure 8:
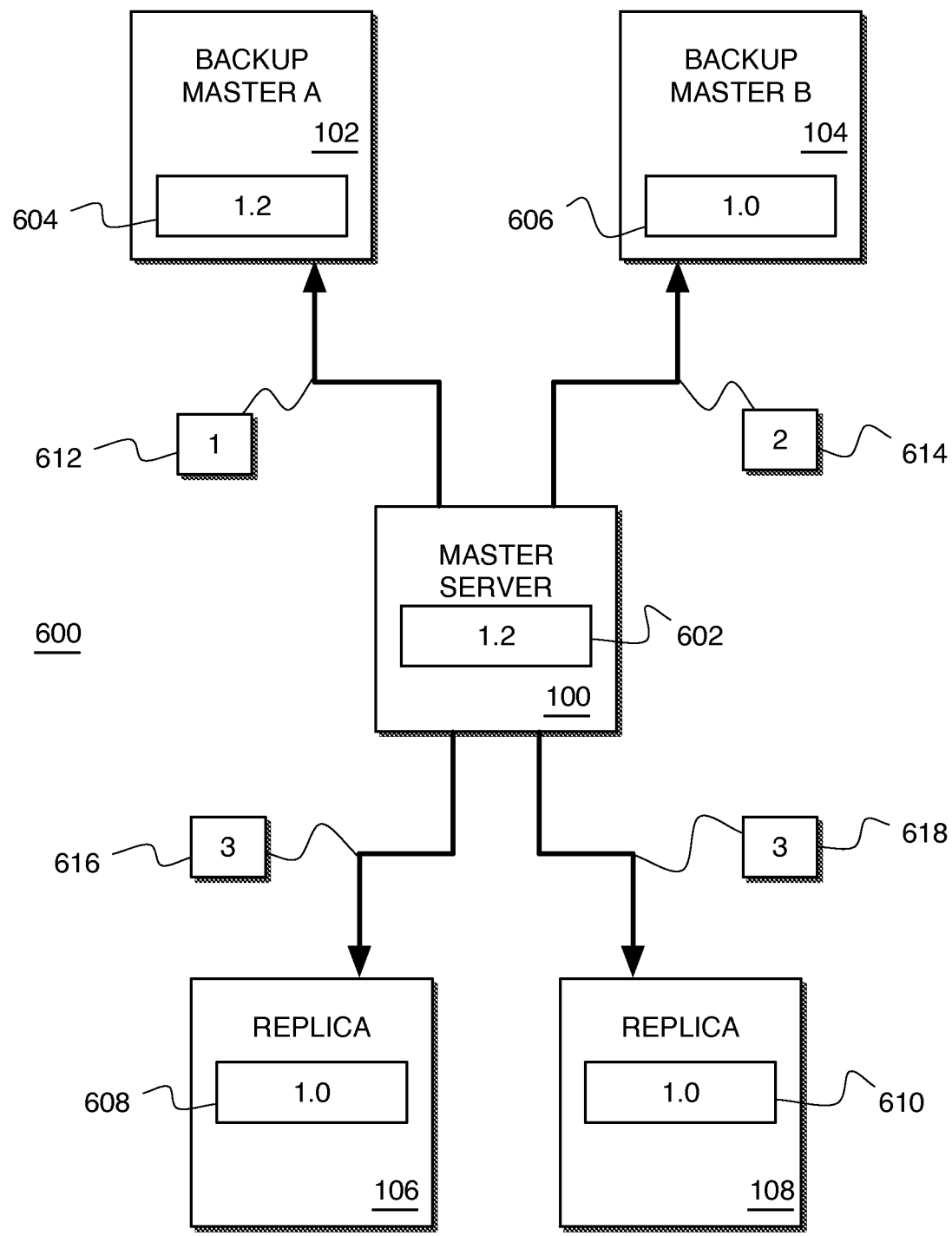
FIG. 8 is a high-level diagram of the FIG. 1 system at a third state.

FIG. 8 depicts the high-level diagram of FIG. 6 at a third state after execution of a set of instructions comprising PRS 212 in order to perform a replication update to push a data update from master server 100 to one of the several nodes, i.e., backup master A 102. As a result of pushing two updates from master server 100 to backup master A 102, the version identifier 604 is set to 1.2. No updates have been pushed to the remaining several nodes.

Figure 9:
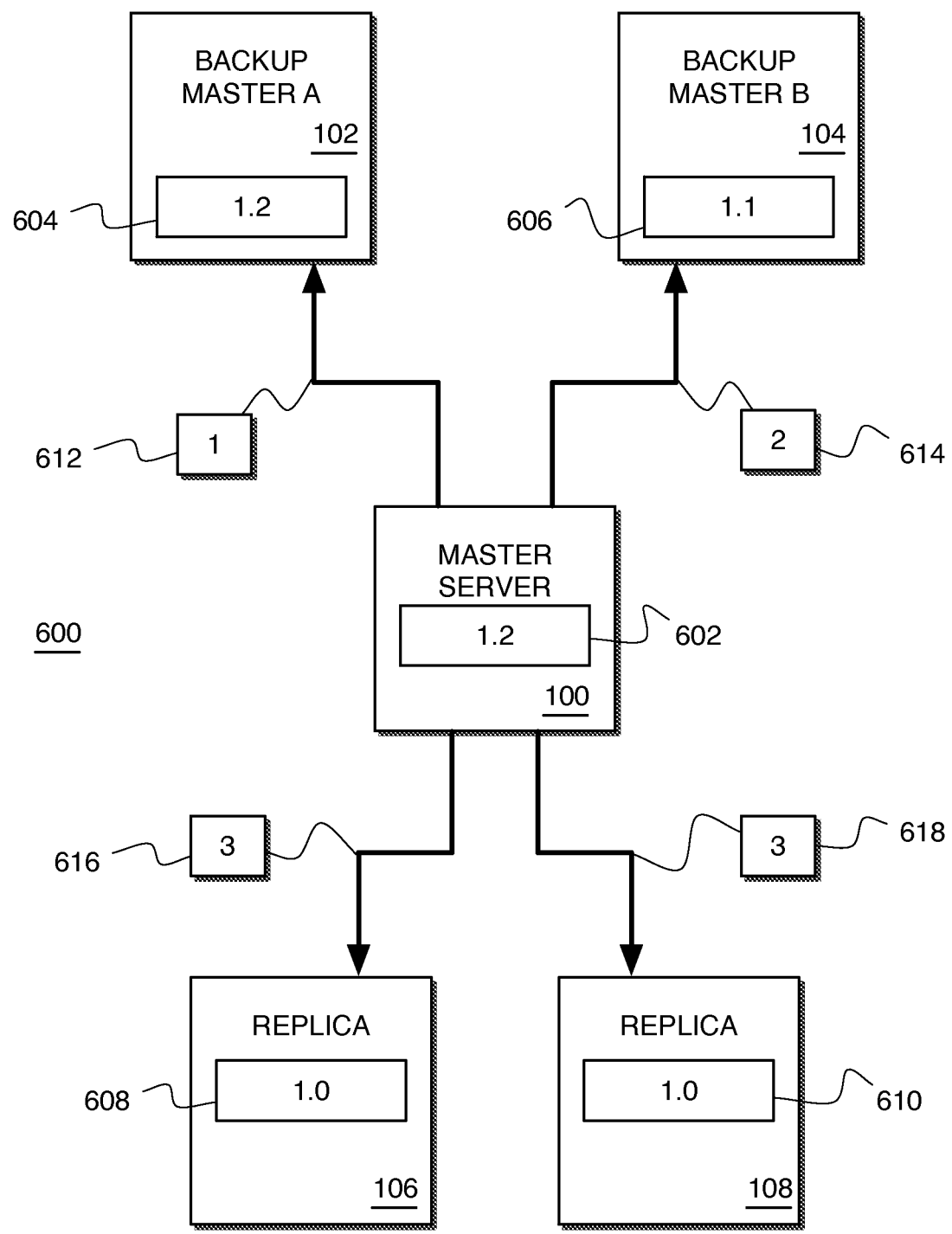
FIG. 9 is a high-level diagram of the FIG. 1 system at a fourth state.

FIG. 9 depicts the high-level diagram of FIG. 6 at a fourth state after execution of a set of instructions comprising PRS 212 in order to perform a replication update to push a data update from master server 100 to backup master B 104. As a result of a network parameter, e.g., high network latency between master server 100 and backup master B 104, a single version update is pushed from the master server to the backup master B. As a result of pushing one update from master server 100 to backup master B 104, version identifier 606 is set to 1.1. No updates have been pushed to the remaining several nodes.

Figure 10:
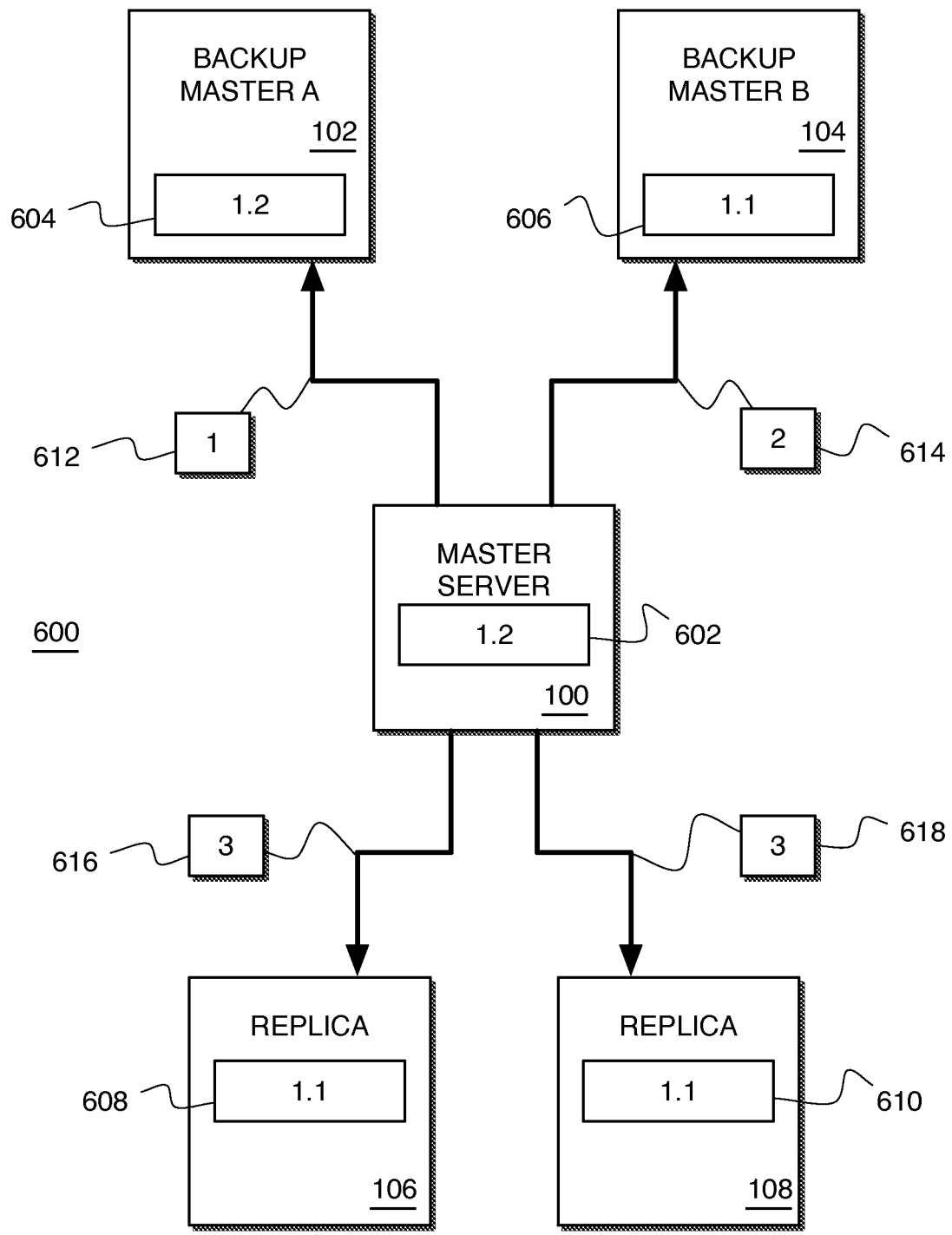
FIG. 10 is a high-level diagram of the FIG. 1 system at a fifth state.

FIG. 10 depicts the high-level diagram of FIG. 6 at a fifth state after execution of a set of instructions comprising PRS 212 in order to perform a replication update to push a data update from master server 100 to first replica 106 and second replica 108. In at least some embodiments, first replica 106 and second replica 108 may be updated in serial, parallel, and/or an overlapped fashion with respect to each other.

In at least some embodiments, because the priority 616, 618 of the ports associated with the replicas 106, 108 is the same, the replicas are updated in parallel. Because the priorities of backup master A 102 (as indicated by priority 604) and backup master B 104 (as indicated by priority 606) are greater than the priority of the replicas 616, 618, the backup masters limit the update level to be applied to the replicas. That is, replicas 106, 108 may be updated to a level no greater than the lowest version of the backup masters 604, 606. As a result, master server 100 executes a set of instructions comprising PRS 212 in order to perform a replication update to push one data update from the master server to replicas 106, 108. As a result of pushing the one update from master server 100 to replicas 106, 108, the version identifiers 608, 610 are set to 1.1 as limited by version identifier 606 of backup master B 104.

Figure 11:
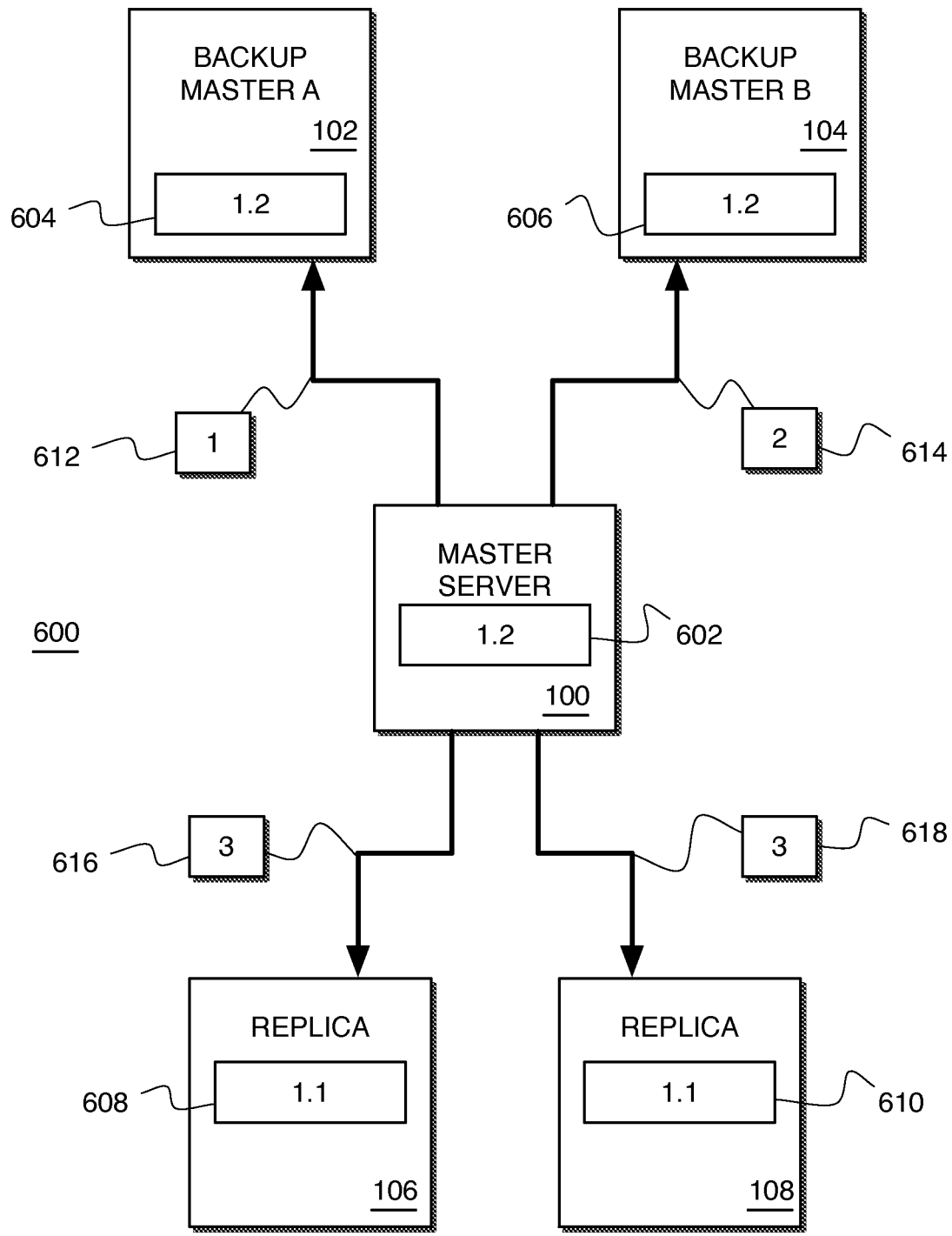
FIG. 11 is a high-level diagram of the FIG. 1 system at a sixth state.

FIG. 11 depicts the high-level diagram of FIG. 6 at a sixth state after execution of a set of instructions comprising PRS 212 in order to perform a replication update to push a data update from master server 100 to backup master B 104. As a result of pushing one more update from master server 100 to backup master B 104, version identifier 606 is set to 1.2. No updates have been pushed to the remaining several nodes.

Figure 12:
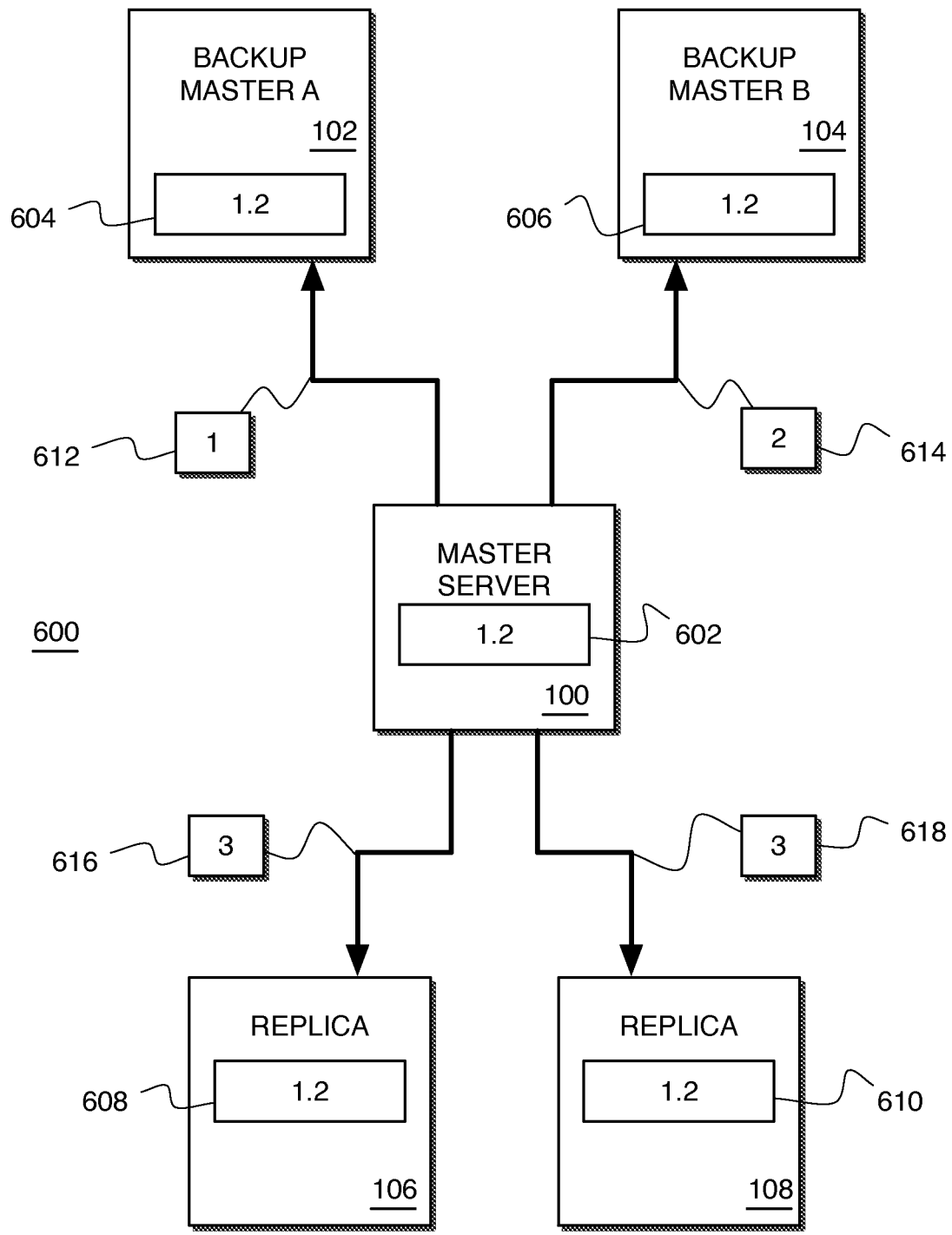
FIG. 12 is a high-level diagram of the FIG. 1 system at a seventh state.

FIG. 12 depicts the high-level diagram of FIG. 6 at a seventh state after execution of a set of instructions comprising PRS 212 in order to perform a replication update to push a data update from master server 100 to replicas 106, 108. As a result of pushing one more update from master server 100 to replicas 106, 108, version identifiers 608, 610 are set to 1.2. No updates have been pushed to the remaining several nodes.

In this manner, updated data may be replicated from master server 100 to each of the several nodes in an orderly fashion.

What is claimed is:

1. A method of updating data at one or more nodes comprising:
    determining a node to which a data update is to be transmitted, wherein the node has a node priority;
    determining a version of data to be provided to the determined node based on a comparison of the version of data at the determined node with another node having a higher node priority; and
    transmitting the determined version of data to the node.

2. The method as claimed in claim 1, wherein the determining a node comprises determining the node based on an ordered traversal of a set of entries corresponding to the one or more nodes.

3. The method as claimed in claim 1, wherein the determining a node comprises determining the node based on at least one of a version entry, a priority entry, or a combination of the version entry and the priority entry corresponding to the node.

4. The method as claimed in claim 1, wherein the determining a version comprises comparing the version of data at the determined node with the lowest version of the next highest priority node.

5. The method as claimed in claim 4, wherein the determining a version comprises setting the determined version to be a next greater version than the version of data at the determined node if the comparison indicates that the version of data at the determined node is less than the lowest version of the next highest priority node.

6. The method as claimed in claim 4, wherein the determining a version comprises setting the determined version to be the lowest version of the next highest priority node if the comparison indicates that the version of data at the determined node is less than the lowest version of the next highest priority node.

7. The method as claimed in claim 1, wherein the transmitting is performed if the determined version of data differs from the version of data at the determined node.

8. The method as claimed in claim 1, wherein the determining a version comprises comparing the version of data at the determined node with a master version.

9. The method as claimed in claim 1, further comprising:
    repeating the determining a node for each entry in a priority table.

10. The method as claimed in claim 1, further comprising:
    performing the determining a node as a result of a version update.

11. The method as claimed in claim 1, further comprising:
    assigning a predetermined priority to each node.

12. A method of updating data from a master node to one or more connected nodes comprising:
    updating data at one of one or more connected nodes to a version no greater than the version of data at the remaining one or more connected nodes having a priority greater than the one node in response to an update notification signal.

13. The method as claimed in claim 12, comprising:
    at a first set of version update processes corresponding to one or more connected nodes:
    performing the updating if the version of data at the corresponding connected node is less than the version of data at another of the one or more connected nodes and if the priority of the corresponding connected node is less than the priority of the another of the one or more connected nodes.

14. The method as claimed in claim 13, comprising:
    suspending the first set of version update processes until the version of data at the corresponding connected node is less than the version of data at another of the one or more connected nodes and the priority of the corresponding connected node is less than the priority of the another of the one or more connected nodes.

15. A computer-readable medium storing instructions which, when executed by a processor, cause the processor to determine a node to which a data update is to be transmitted, wherein the node has a node priority; determine a version of data to be provided to the determined node based on a comparison of the version of data at the determined node with another node having a higher node priority; and transmit the determined version of data to the node.

16. The computer-readable medium as claimed in claim 15, wherein a first instance of the stored instructions, when executed by the processor, causes the processor to suspend execution of the first instance if a data version identifier of the first instance is greater than or equal to a data version identifier of other instances of the stored instructions.

17. The computer-readable medium as claimed in claim 15, wherein a first instance of the stored instructions, when executed by the processor, causes the processor to suspend execution of the first instance if a data version identifier of the first instance is greater than or equal to a data version identifier of other instances of the stored instructions where the other instances have a priority identifier greater than a priority identifier of the first instance.

18. The computer-readable medium as claimed in claim 15, wherein a first instance of the stored instructions, when executed by the processor, causes the processor to transmit the determined version if the data version identifier of the first instance is less than the data version identifier of the other instances.

19. The computer-readable medium as claimed in claim 15, wherein a first instance of the stored instructions, when executed by the processor, causes the processor to transmit the determined version if the data version identifier of the first instance is less than the data version identifier of the other instances and if the priority identifier of the first instance is less than the priority identifier of the other instances.

20. The computer-readable medium as claimed in claim 15, wherein a first instance of the stored instructions, when executed by the processor, causes the processor to transmit the determined version if the data version identifier of the first instance is less than the data version identifier of one of the other instances of the stored instructions having a priority identifier which is incrementally greater than a priority identifier of the first instance.

21. A system for updating data at one or more nodes, the system comprising:
   at least one master server; and
   one or more nodes arranged to connect with the master server;
   wherein the master server comprises:
      one or more versions of master data;
      a priority identifier corresponding to at least one of the one or more nodes; and
      a set of instructions which, when executed by the master server, cause the master server to determine a node of the one or more nodes to which a data update is to be transmitted; determine a version of data to be provided to the determined node based on a comparison of the version of data at the determined node with another of the one or more nodes having a greater priority identifier; and transmit the determined version of data to the determined node.

* * * * *